(12) United States Patent
Komori et al.

(10) Patent No.: US 6,615,727 B2
(45) Date of Patent: Sep. 9, 2003

(54) COLOR MANAGEMENT METHOD AND APPARATUS FOR PRINTING PRESS

(75) Inventors: Yoshinori Komori, Ibaraki (JP); Akihiro Inde, Ibaraki (JP)

(73) Assignee: Komori Corporation, Tokyo (JP)

( * ) Notice: Subject to any disclaimer, the term of this patent is extended or adjusted under 35 U.S.C. 154(b) by 0 days.

(21) Appl. No.: 09/859,757

(22) Filed: May 16, 2001

(65) Prior Publication Data

US 2001/0042483 A1 Nov. 22, 2001

(30) Foreign Application Priority Data

May 17, 2000 (JP) ........................................ 2000-145578

(51) Int. Cl.⁷ ............................................... B41F 13/24
(52) U.S. Cl. ........................ 101/484; 101/171; 101/181
(58) Field of Search ................................. 101/484, 483, 101/171, 181; 358/1.9

(56) References Cited

U.S. PATENT DOCUMENTS 5,687,300 A * 11/1997 Cooper ........................ 358/1.9
6,137,594 A * 10/2000 Decker et al. ............... 358/1.9

OTHER PUBLICATIONS

"Specification of Colour of Materials according to the CIE 1976 (L*a*b) Space and the CIE 1976 (L*a*b) Space", JIS Z 8726, Feb. 19, 1980.
"Method of Specification of Colour Differences for Opaque Materials" JIS Z 8730, Feb. 1980.

* cited by examiner

*Primary Examiner*—Charles H. Nolan, Jr.
(74) *Attorney, Agent, or Firm*—Blakely, Sokoloff, Taylor & Zafman

(57) ABSTRACT

In a color management method for a printing press, the first profile representing color reproduction characteristics of a first printing press is generated using color data of a number of patches printed by the first printing press and the dot area percent of each of a plurality of ink colors defined for each patch. The second profile representing color reproduction characteristics of a second printing press is generated using color data of a number of patches printed by the second printing press and the dot area percent of each of a plurality of ink colors defined for each patch. The dot area percent of each ink color to be used to print a printing product by the second printing press is obtained on the basis of the first and second profiles. A color management apparatus for a printing press is also disclosed.

14 Claims, 10 Drawing Sheets

COLOR MANAGEMENT METHOD AND APPARATUS FOR PRINTING PRESS

BACKGROUND OF THE INVENTION

The present invention relates to a color management method and apparatus for a printing press, which are suitable for color matching between printing products printed by two printing presses.

Generally, when printing products are ordered, a color proofing print is presented to the customer in advance to confirm the tint of final printing products. More specifically, a color proofing print is output using a color proofing apparatus (flat-bed proofing machine, color printer, DDCP (Direct Digital Color Proofer), or simplified proofing machine) and presented to the customer to confirm whether the tint is appropriate. If the customer agrees to the tint, the ink supply amount of each color in a printing press is adjusted so that actual printing products have the same tint as that of the color proofing print.

However, it is very difficult to print the same tint as that of the color proofing print by adjusting the ink supply amount of each color in the printing press because the color proofing apparatus and printing press have different color reproduction characteristics, resulting in troubles between the customer and the printing company.

Recently, the color reproduction characteristics of the color proofing apparatus and printing press are checked in advance, and color proofing is done by tint according to the tint of printing products printed by the printing press, thereby preventing troubles with the customer. More specifically, a profile representing the color reproduction characteristic of the color proofing apparatus is compared with a profile representing the color reproduction characteristic of the printing press, and the dot area percent of each of a plurality of standard ink colors in outputting a color proofing print, i.e., the ratio (%) (printed area of a color per unit area) of dots of each of four standard ink colors (to be referred to as ink colors hereinafter), including three primary colors of process inks: yellow, magenta (red), and cyan (blue), and India ink (black) is adjusted such that the color proofing print and printing products printed by the printing press have the same tint. This processing of adjusting the tint to obtain the same colors by the apparatus and printing press is called color matching.

However, in some conventional cases as described above, a printing press A to be used for printing becomes unavailable after color proofing due to machine troubles, process management problems, and the like, and an alternative printing press B need be used. In this case, printing must be performed in the same tint as that of the color proofing print, to which the customer agrees, using the printing press B. In printing using the printing press B, the operator is required to adjust the ink supply amount referring to the color proofing print. This operation is very time-consuming and imposes a severe burden on the operator.

Also, in other cases, the tint cannot be adjusted sufficiently in the printing process, and the printing plate must be generated again. In this case, in addition to the request for more time and a heavier load, printing materials are wasted.

SUMMARY OF THE INVENTION

It is an object of the present invention to provide a color management method and apparatus for a printing press, which can lighten the burden imposed on the operator in alternative printing after color proofing.

It is another object of the present invention to provide a color management method and apparatus for a printing press, which can shorten the time to adjust the tint in alternative printing after color proofing.

It is still another object of the present invention to provide a color management method and apparatus for a printing press, which can avoid waste of printing materials in alternative printing after color proofing.

In order to achieve the above objects, according to the present invention, there is provided a color management method for a printing press, comprising the steps of generating a first profile representing color reproduction characteristics of a first printing press using color data of a number of patches printed by the first printing press and a dot area percent of each of a plurality of ink colors defined for each patch, generating a second profile representing color reproduction characteristics of a second printing press using color data of a number of patches printed by the second printing press and a dot area percent of each of a plurality of ink colors defined for each patch, and obtaining the dot area percent of each ink color to be used to print a printing product by the second printing press on the basis of the first and second profiles.

DESCRIPTION OF THE PREFERRED EMBODIMENT

The present invention will be described below with reference to the accompanying drawings.

Figure 1:
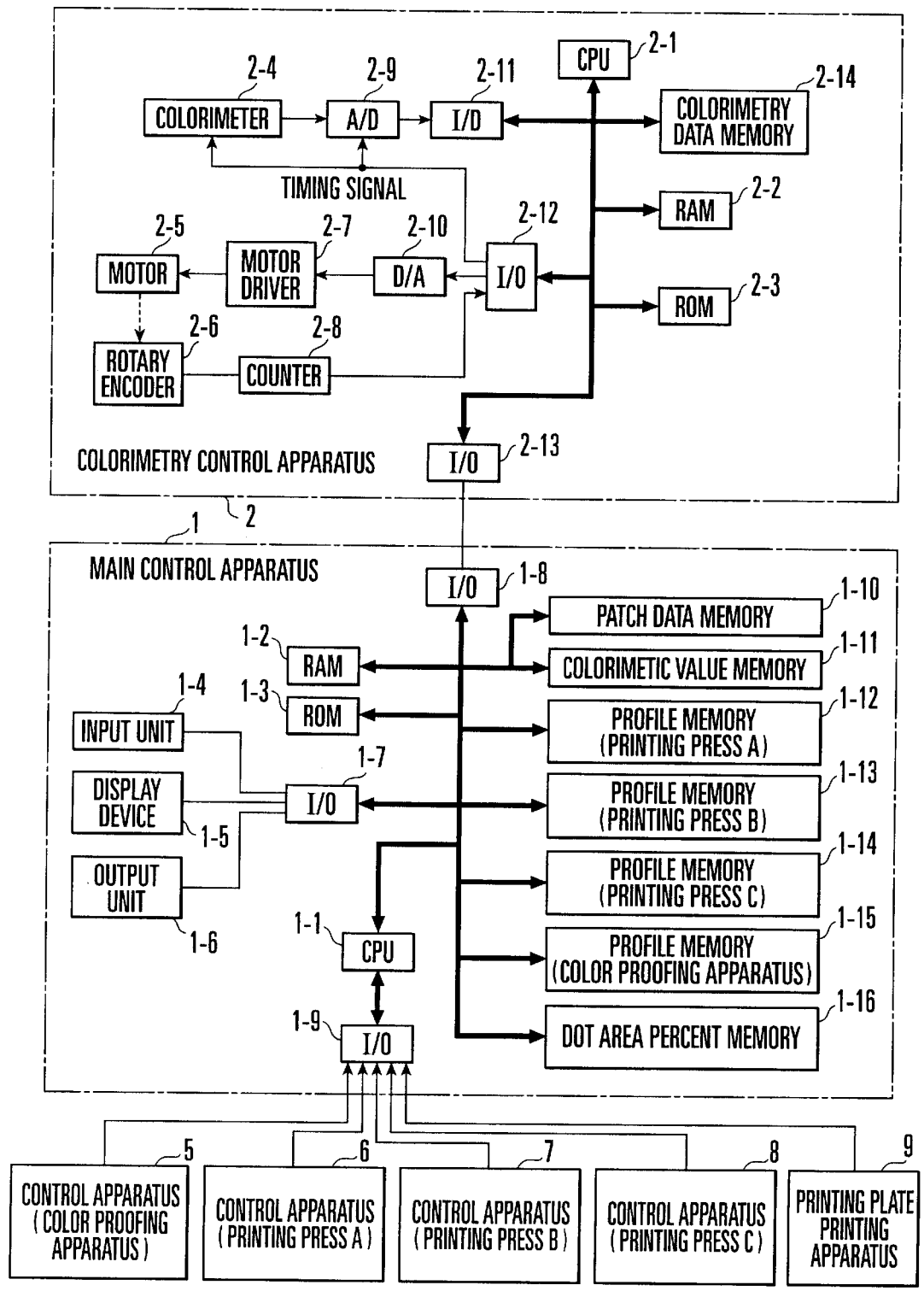
FIG. 1 is a block diagram showing a color management apparatus for a printing press according to an embodiment of the present invention.

FIG. 1 shows a color management apparatus for a printing press according to an embodiment of the present invention.

Referring to FIG. 1, the color management apparatus comprises a main control apparatus 1 and a colorimetry control apparatus 2 for controlling a colorimeter (to be described later) under the control of the main control apparatus 1. A control apparatus 5 of a color proofing apparatus, a control apparatus 6 of a printing press A, a control apparatus 7 of a printing press B, a control apparatus 8 of a printing press C, and a printing plate printing apparatus 9 are connected to the main control apparatus 1. The color proofing apparatus, the printing press A, the printing press B, and the printing press C are not shown in FIG. 1.

The main control apparatus 1 comprises a CPU (Central Processing Unit) 1-1, RAM (Random Access Memory) 1-2, ROM (Read Only Memory) 1-3, input unit 1-4, display device 1-5, output unit 1-6, I/O interfaces 1-7 to 1-9, and memories 1-10 to 1-16 (to be described later). The CPU 1-1 obtains various input information supplied through the I/O interfaces 1-7 to 1-9 and performs various processing operations in accordance with a program stored in the ROM 1-3 while accessing the RAM 1-2 or memories 1-10 to 1-16.

The colorimetry control apparatus 2 comprises a CPU 2-1, RAM 2-2, ROM 2-3, colorimeter 2-4, motor 2-5 for moving the colorimeter, rotary encoder 2-6, motor driver 2-7, counter 2-8, A/D converter 2-9, D/A converter 2-10, I/O interfaces 2-11 to 2-13, and colorimetry data memory 2-14. The CPU 2-1 obtains various input information supplied through the I/O interfaces 2-11 to 2-13 and performs various processing operations in accordance with a program stored in the ROM 2-3 while accessing the RAM 2-2 or memory 2-14. The rotary encoder 2-6 generates a rotary pulse every predetermined rotation count (angle) of the motor 2-5 and outputs the pulse to the counter 2-8.

[Color Matching between Printing Press A and Color Proofing Apparatus]

Figure 2:
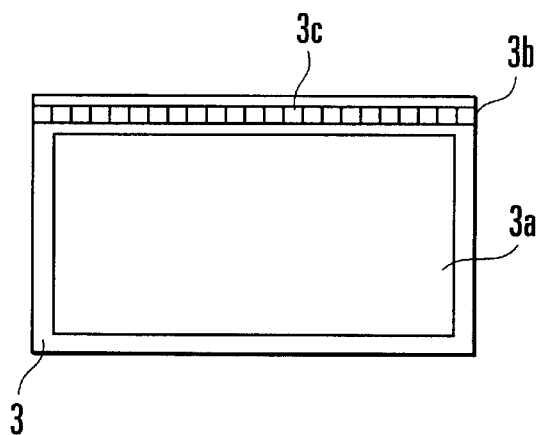
FIG. 2 is a plan view showing a printing product printed by the printing press A.

FIG. 2 shows a printing product printed by a printing press (not shown). For a printing product 3, a pattern is printed in a region 3a at the center, and a band-shaped color chart (color bar) 3b is printed in the margin portion except the pattern region 3a. For a general four-color printing product using black, cyan, magenta, and yellow inks, the color chart 3b is formed from a number of patches having different values as the dot area percent of the respective colors, e.g., black 5%, cyan 10%, magenta 10%, and yellow 10%, or black 5%, cyan 20%, magenta 10%, and yellow 20%.

Figure 3:
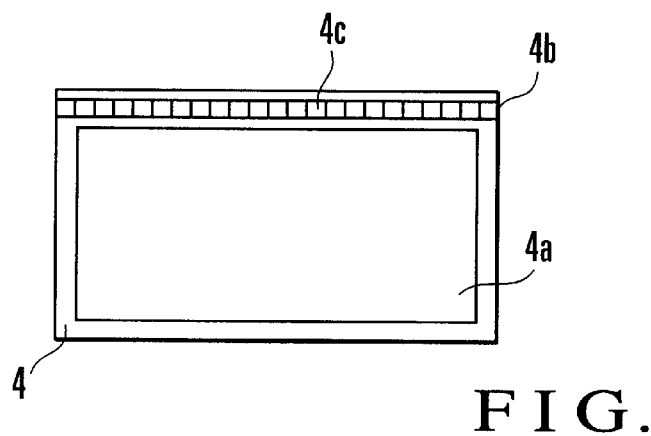
FIG. 3 is a plan view showing a color proofing print output from a color proofing apparatus.

FIG. 3 shows a color proofing print output from a color proofing apparatus (not shown). For a color proofing print 4, a pattern is output to a region 4a at the central portion, and a band-shaped color chart (color bar) 4b is output to the margin portion except the pattern region 4a. For a general four-color color proofing print using black, cyan, magenta, and yellow inks, the color chart 4b is formed from a number of patches having different values as the dot area percent of the respective colors, e.g., black 5%, cyan 10%, magenta 10%, and yellow 10%, or black 5%, cyan 20%, magenta 10%, and yellow 20%.

In the main control apparatus 1, the patch data memory 1-10 stores the positions of patches of the color chart 3b printed on the printing product 3, and the dot area percent of each ink color, which is predetermined in correspondence with each patch 3c. The patch data memory 1-10 stores the positions of patches 4c of the color chart 4b output to the color proofing print 4 (FIG. 3), and the dot area percent of each ink color, which is predetermined in correspondence with each patch 4c. Predetermined dot area percent (0% to 100%) of the respective colors, e.g., the first patch 3c, 5% for black, 10% for cyan, 10% for magenta, and 10% for yellow are stored in correspondence with the first patch 3c, 5% for black, 20% for cyan, 10% for magenta, and 20% for yellow are stored in correspondence with the second patch 3c as the dot area percent of the respective colors and, 0% for black, 10% for cyan, 50% for magenta, and 20% for yellow are stored in correspondence with the third patch 3c as the dot area percent of the respective colors.

The colorimetic value memory 1-11 stores colorimetic values obtained from the color data of each patch 3c of the color chart 3b printed on the printing product 3, which is sampled by the colorimeter 2-4. The colorimetic value memory 1-11 stores colorimetic values obtained from the color data of each patch 4c of the color chart 4b output to the color proofing print 4, which is sampled by the colorimeter 2-4. Color data sampling from the patches 3c and 4c using the colorimeter 2-4 will be described later.

For example, the colorimetic values comprise a psychometric lightness L' representing a color space and psychometric chroma coordinates a' and b', which are defined by CIE (Commission Internationale de l'Eclairage). The psychometric lightness L' and psychometric chroma coordinates a' and b' are described in detail in "Specification of Colour of Materials according to the CIE 1976 (L'a'b') Space and the CIE 1976 (L'u'v') Space", JIS Z 8729, February 1980 and "Method for Specification of Colour Differences for Opaque Materials", JIS Z 8730, February 1980.

The profile memories 1-12 to 1-14 store respective profiles (the relationships, each of which is between the dot area percent and the colorimetic values of each ink color of each printed patch) representing the respective color reproduction characteristics of the printing presses A to C. The profile memory 1-15 stores a profile (the relationship between the dot area percent and the colorimetic values of each ink color of each printed patch) representing the color reproduction characteristic of the color proofing apparatus. The procedure of generating the profiles to be stored in the memories 1-12 and 1-15 will be described later. The dot area percent memory 1-16 stores the dot area percent of each part of a printing plate for each ink color, which is used to print the printing product 3.

Each part means a long region of the printing plate divided in the axial direction of the ink fountain roller in correspondence with a plurality of blades (to be described later). An ink amount to be supplied to a corresponding long region is adjusted by opening/closing a blade.

Figure 4:
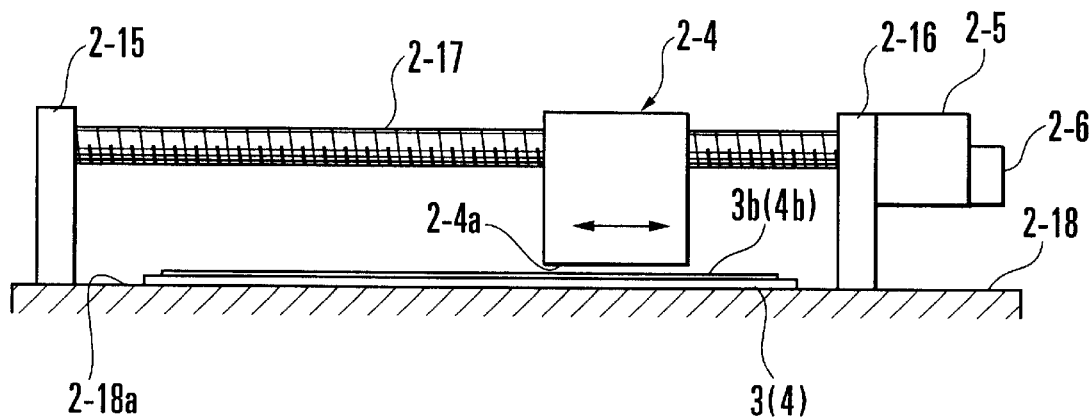
FIG. 4 is a front view showing the installation state of a colorimeter.

In the colorimetry control apparatus 2, the colorimeter 2-4 is attached to a ball screw (feed screw) 2-17 provided between columns 2-15 and 2-16, as shown in FIG. 4. The ball screw 2-17 is rotated in the forward or reverse direction by the motor 2-5. As the ball screw 2-17 rotates in the forward or reverse direction, the colorimeter 2-4 is guided by the ball screw 2-17 and moves between the columns 2-15 and 2-16. A head portion 2-4a of the colorimeter 2-4 opposes a surface 2-18a of a measuring table 2-18, on which a measurement target is placed.

[Procedure of Color Matching Processing between Printing Press A and Color Proofing Apparatus]

First, the printing product 3 (FIG. 2) is printed by the printing press, and the color proofing print 4 (FIG. 3) is output from the color proofing apparatus. The color chart 3b formed from a number of patches 3c each having predetermined dot area percent of the respective ink colors is printed in the margin portion of the printing product 3. The color chart 4b is output to the margin portion of the color proofing print 4. The color chart 4b is formed from a number of patches 4c each having predetermined dot area percent of the respective colors.

Figure 5:
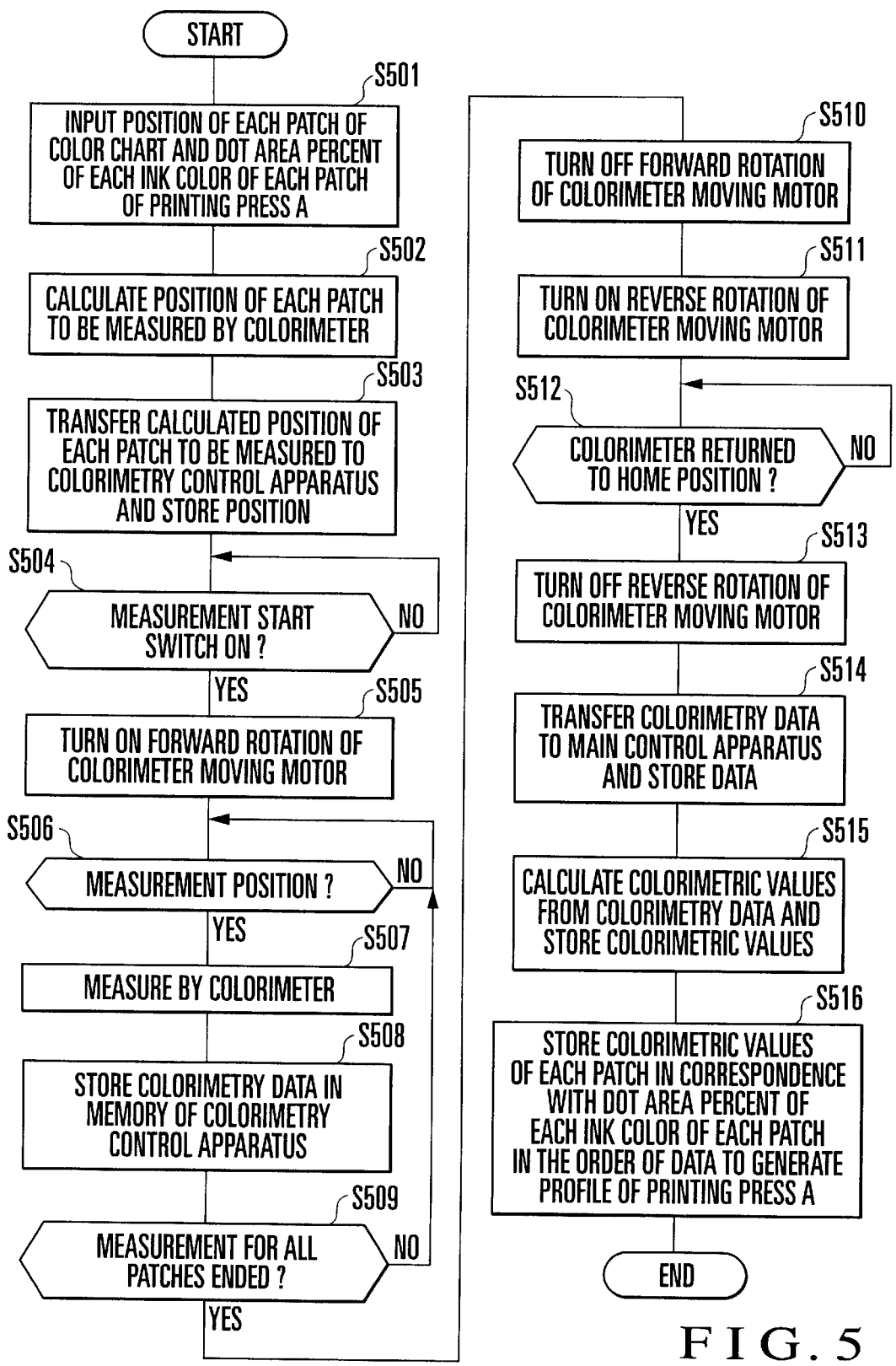
FIG. 5 is a flow chart showing the press A profile generation operation.

[Generation of Profile of Printing Press A (FIG. 5)]

The operator sets the printing product 3 immediately after printing by the printing press on the measuring table 2-18 (FIG. 4) as a measurement target. In this set state, the color chart 3b printed on the printing product 3 opposes the lower surface of the head portion 2-4a of the colorimeter 2-4.

The operator inputs, from the input unit 1-4, the position of each patch 3c of the color chart 3b and the dot area percent of each ink color of each patch 3c (step S501). The input dot area percent of each ink color of each patch 3c has not a measurement value from a printing plate on which each patch 3c is printed, or the actually printed printing product 3 but a value predetermined for each ink color of each patch 3c. More specifically, a value actually input to the printing plate printing apparatus in correspondence with each patch 3c in generating a printing plate for each ink color of the printing product 3 is used as a set value, and this set value is input in step S501 as the dot area percent of each ink color of each patch 3c.

The CPU 1-1 stores, in the patch data memory 1-10, the input position of each patch 3c of the input color chart 3b, and the dot area percent of each ink color of each patch 3c. The position (measurement position) of each patch 3c to be measured by the colorimeter 2-4 is calculated (step S502) and the calculated measurement position is transferred to the colorimetry control apparatus 2 (step S503). The transferred measurement position of each patch 3c is stored in the RAM 2-2.

Next, the operator turns on the start switch (not shown) of the input unit 1-4 of the printing press A. When the start switch is turned on (YES in step S504), the CPU 1-1 of the main control apparatus 1 sends a measurement start command to the CPU 2-1 of the colorimetry control apparatus 2. Upon receiving the measurement start command from the main control apparatus 1, the CPU 2-1 of the colorimetry control apparatus 2 rotates the motor 2-5 in the forward direction (step S505).

As the motor 2-5 rotates in the forward direction, the ball screw 2-17 rotates in the forward direction, and the colorimeter 2-4 is guided by the ball screw 2-17 and moves toward the column 2-15 from the home position where the colorimeter 2-4 is in contact with the column 2-16. The CPU 2-1 monitors the momentary moving position of the colorimeter 2-4 through the rotary encoder 2-6 (step S506). When the colorimeter 2-4 reaches the first measurement position stored in the RAM 2-2, the color data of the patch 3c corresponding to the measurement position is sampled by the colorimeter 2-4 (step S507). The CPU 2-1 stores the color data (colorimetry data) from the colorimeter 2-4 in the colorimetry data memory 2-14 (step S508).

In a similar way, every time the colorimeter 2-4 reaches a measurement position stored in the RAM 2-2, the CPU 2-1 samples color data of the patch 3c located at the measurement position by the colorimeter 2-4 and stores the sampled color data in the colorimetry data memory 2-14. That is, the CPU 2-1 controls automatic scanning of the colorimeter 2-4, thereby sequentially sampling the color data of the patches 3c of the color chart 3b printed on the printing product 3.

The CPU 2-1 determines whether color data sampling for all patches 3c of the color chart 3b is ended (step S509). When sampling is ended, the forward rotation of the motor 2-5 is stopped (step S510). Next, the CPU 2-1 rotates the motor 2-5 in the reverse direction (step S511) to return the colorimeter 2-4 to the home position and then stops reverse rotation of the motor 2-5 (steps S512 and S513).

The CPU 2-1 transfers the colorimetry data of each patch 3c, which is stored in the memory 2-14, to the main control apparatus 1 (step S514). The transferred colorimetry data of each patch 3c is stored in the RAM 1-2. The CPU 1-1 of the main control apparatus 1 calculates colorimetic values from the colorimetry data of each patch 3c from the colorimetry control apparatus 2 and stores them in the colorimetic value memory 1-11 (step S515). Next, the CPU 1-1 makes the colorimetic values of each patch in the colorimetic value memory 1-11 correspond to the dot area percent of each ink color of each patch 3c, which is stored in the patch data memory 1-10, in the order of data, and stores these relationships in the profile memory 1-12 as the profile of the printing press A (step S516).

Figure 6:
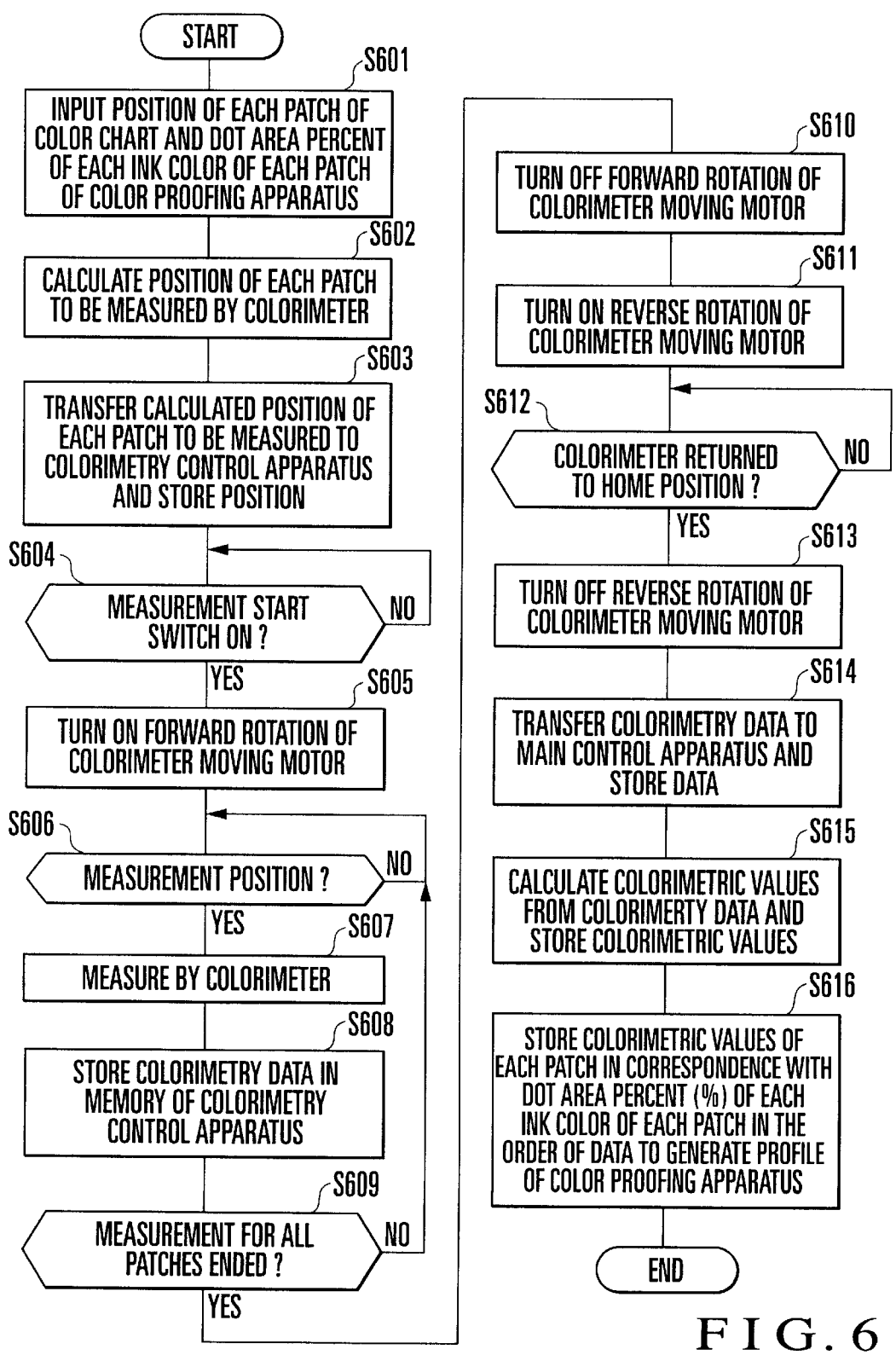
FIG. 6 is a flow chart showing the color proofing apparatus profile generation operation.

[Generation of Profile of Color Proofing Apparatus (FIG. 6)]

The operator sets the color proofing print 4 immediately after output from the color proofing apparatus on the measuring table 2-18 (FIG. 4) as a measurement target. In this set state, the color chart 4b output to the color proofing print 4 opposes the lower surface of the head portion 2-4a of the colorimeter 2-4. In outputting the color proofing print 4, a dot area percent predetermined in correspondence with each ink color of each patch 4c is input to the color proofing apparatus. At this time, the input dot area percent of each ink color of each patch 4c has the same value as that actually input to the printing plate printing apparatus in correspondence with each patch 3c in generating the printing plate for each ink color of the printing product 3.

The operator inputs, from the input unit 1-4, the position of each patch 4c of the color chart 4b and the dot area percent of each ink color of each patch 4c (step S601). The input dot area percent of each ink color of each patch 4c has not a measurement value from the color proofing print 4 but a value predetermined for each patch 4c. More specifically, a value actually input to the color proofing apparatus in correspondence with each patch 4c in outputting the color proofing print 4 is used as a set value, and this set value is input in step S601 as the dot area percent of each ink color of each patch 4c. The input set value of the dot area percent of each ink color of each patch 4c is the same as the value input to the printing plate printing apparatus in correspondence with each patch 3c in generating the printing plate for each ink color of the printing product 3.

The CPU 1-1 stores, in the patch data memory 1-10, the input position of each patch 4c of the input color chart 4b, and the dot area percent of each ink color of each patch 4c. The CPU 1-1 calculates the position (measurement position) of each patch 4c to be measured by the colorimeter 2-4 (step S602), and transfers the calculated measurement position of each patch 4c to the colorimetry control apparatus 2 (step S603). The transferred measurement position of each patch 4c is stored in the RAM 2-2.

Next, the operator turns on the start switch (not shown) of the input unit 1-4. When the ON state of the start switch is detected (step S604), the CPU 1-1 of the main control apparatus 1 sends a measurement start command to the CPU 2-1 of the colorimetry control apparatus 2. Upon receiving the measurement start command from the main control apparatus 1, the CPU 2-1 of the colorimetry control apparatus 2 rotates the motor 2-5 in the forward direction (step S605).

As the motor 2-5 rotates in the forward direction, the ball screw 2-17 rotates in the forward direction, and the colorimeter 2-4 is guided by the ball screw 2-17 and moves toward the column 2-15 from the home position where the colorimeter 2-4 is in contact with the column 2-16. The CPU 2-1 monitors the momentary moving position of the colorimeter 2-4 through the rotary encoder 2-6 (step S606). When the colorimeter 2-4 reaches the first measurement position stored in the RAM 2-2, the CPU 2-1 samples the color data of the patch 4c located at the measurement position by the colorimeter 2-4 (step S607). The CPU 2-1 stores the color data (colorimetry data) output from the colorimeter 2-4 in the colorimetry data memory 2-14 (step S608).

In a similar way, every time the colorimeter 2-4 reaches a measurement position stored in the RAM 2-2, the CPU 2-1 samples the color data of the patch 4c located at the measurement position by the colorimeter 2-4 and stores the sampled color data in the colorimetry data memory 2-14. That is, the CPU 2-1 controls automatic scanning of the colorimeter 2-4, thereby sequentially sampling the color data of the patches 4c of the color chart 4b output to the color proofing print 4.

The CPU 2-1 determines whether color data sampling for all patches 4c of the color chart 4b is ended (step S609). When sampling is ended, the forward rotation of the motor 2-5 is stopped (step S610). Next, the CPU 2-1 rotates the motor 2-5 in the reverse direction (step S611) to return the colorimeter 2-4 to the home position and then stops reverse rotation of the motor 2-5 (steps S612 and S613).

The CPU 2-1 transfers the colorimetry data of each patch 4c, which is stored in the memory 2-14, to the main control apparatus 1 (step S614). The transferred colorimetry data of each patch 4c is stored in the RAM 1-2. The CPU 1-1 of the main control apparatus 1 calculates colorimetic values (L'a'b') from the colorimetry data of each patch 4c from the colorimetry control apparatus 2 and stores them in the colorimetic value memory 1-11 (step S615).

Next, the CPU 1-1 makes the colorimetic values in the colorimetic value memory 1-11 correspond with the colorimetic values with the dot area percent of each color of each patch 4c, which is stored in the patch data memory 1-10, in the order of data, and stores these relationships in the profile memory 1-15 as the profile of the color proofing apparatus (step S616).

Figure 7:
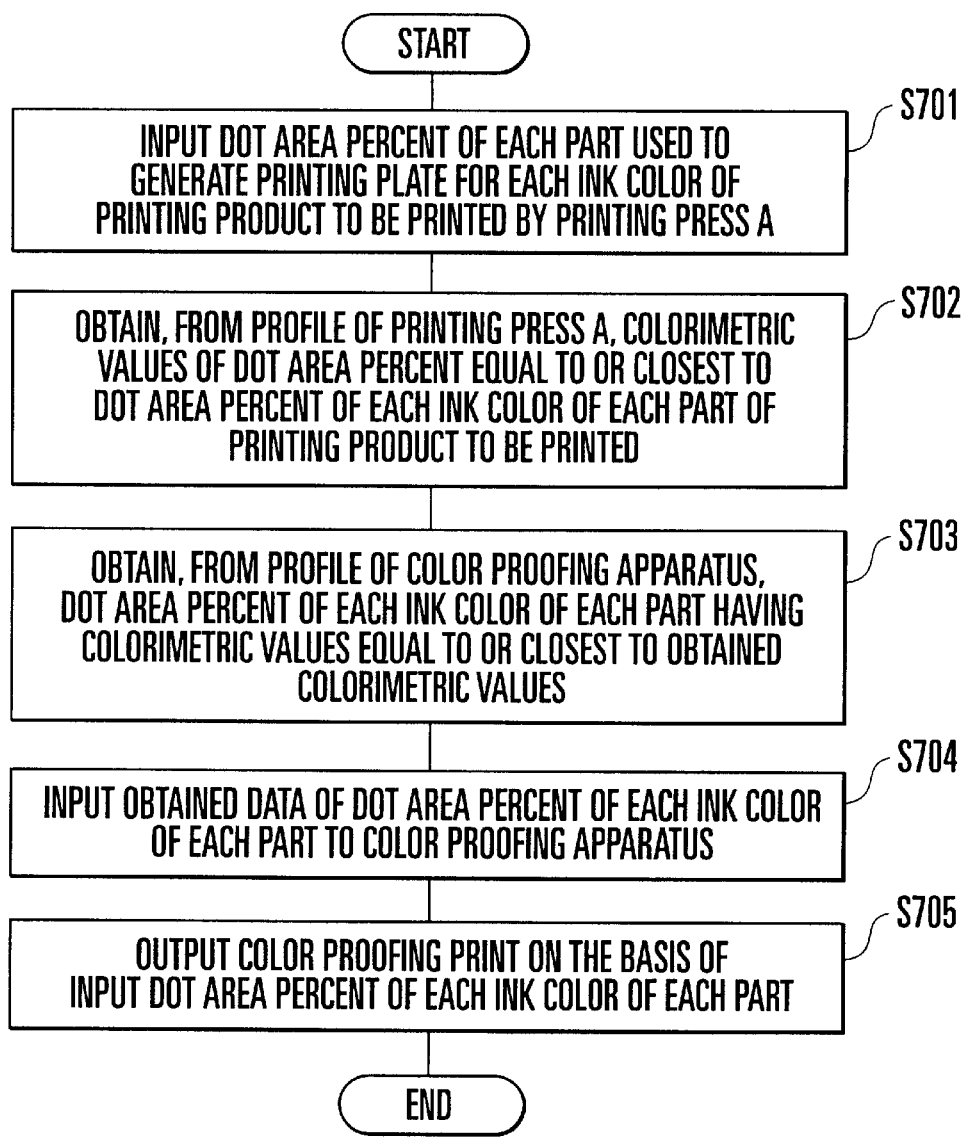
FIG. 7 is a flow chart showing the color matching operation between the printing press A and the color proofing apparatus.

[Color Matching (FIG. 7)]

The operator inputs, from the input unit 1-4, the dot area percent of each part of a printing plate for each ink color, which is used to generate the printing plate and print the printing product by the printing press A (step S701). At this time, the input dot area percent of each part of the printing plate for each ink color has not a measurement value from the printing plate but a value predetermined for the part of the printing plate. More specifically, the value actually input to the printing plate printing apparatus in generating the printing plate for each ink color is used as a set value, and this set value is input in step S701 as the dot area percent of each part for each ink color. This dot area percent is the same as that input to the color proofing apparatus to generate the color proofing print.

The CPU 1-1 obtains colorimetic values (three values) corresponding to a dot area percent equal or closest to the dot area percent of each part for generating the printing plate for each ink color from the profile of the printing press in A the profile memory 1-12 (step S702). Next, the CPU 1-1 obtains the dot area percent of each ink color having colorimetic values equal or closest to the colorimetic values (three values) obtained in step S702 from the profile of the color proofing apparatus in the profile memory 1-15 (step S703). The CPU 1-1 inputs the obtained data of dot area percent of each ink color to the color proofing apparatus (step S704). The color proofing apparatus outputs a color proofing print on the basis of the dot area percent of each ink color supplied from the main control apparatus 1 (step S705). This enables the printing products printed by the printing press A and the color proofing print output from the color proofing apparatus to have the same tint.

[Color Matching between Printing Press A and Printing Press B]

When the printing press A to be used for printing becomes unavailable, an alternative printing press B is used for printing. In this case, color matching is performed between the printing press A and printing press B.

Figure 9:
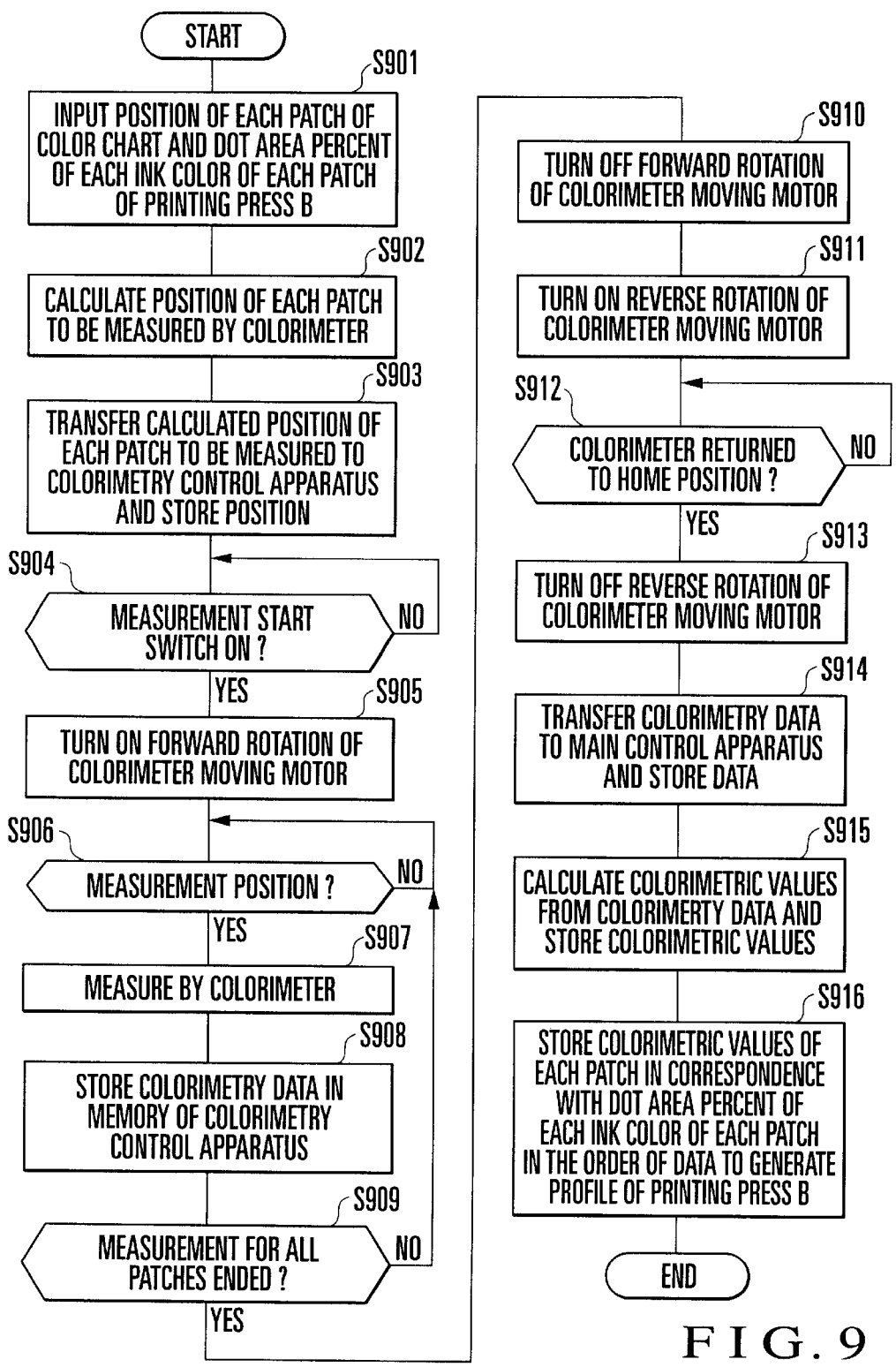
FIG. 9 is a flow chart showing the press B profile generation operation.

[Generation of Profile of Printing Press B (FIG. 9)]

Figure 8:
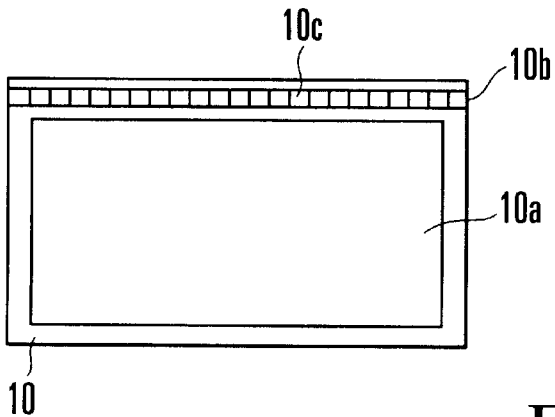
FIG. 8 is a plan view showing a printing product printed by the printing press B.

A printing product 10 shown in FIG. 8 is printed by the printing press B. A color chart 10b is printed in the margin portion of the printing product 10. The color chart 10b is formed from a number of patches 10c each having predetermined dot area percent of the respective ink colors. The operator sets the printing product 10 immediately after printing by the printing press B on the measuring table 2-18 (FIG. 4) as a measurement target.

Next, the operator inputs the position of each patch 10c of the color chart 10b and the dot area percent of each ink color of each patch 10c to the input unit 1-4 (step S901). At this time, the input dot area percent of each ink color of each patch 10c has not a measurement value from a printing plate on which each patch 10c is printed, or the actually printed printing product 10 but a value predetermined for each ink color of each patch 10c. More specifically, a value actually input to the printing plate printing apparatus 9 in correspondence with each patch 10c in generating a printing plate for each ink color is used as a set value, and this set value is input in step S901 as the dot area percent of each ink color of each patch 10c.

The CPU 1-1 stores, in the patch data memory 1-10, the input position of each patch 10c of the input color chart 10b, and the dot area percent of each ink color of each patch 10c. The position (measurement position) of each patch 10c to be measured by the colorimeter 2-4 is calculated (step S902) and the calculated measurement position of each patch 10c is transferred to the colorimetry control apparatus 2 (step S903). The transferred measurement position of each patch 10c is stored in the RAM 2-2.

Next, the operator turns on the start switch (not shown) of the printing press B in the input unit 1-4. When the start switch is turned on (step S904), the CPU 1-1 of the main control apparatus 1 sends a measurement start command to the CPU 2-1 of the colorimetry control apparatus 2. Upon receiving the measurement start command from the main control apparatus 1, the CPU 2-1 of the colorimetry control apparatus 2 rotates the motor 2-5 in the forward direction (step S905). After executing the same processings as in steps S506 to S513 shown in FIG. 5, the CPU 2-1 transfers the colorimetry data of each patch 10c to the main control apparatus 1 (step S914).

The transferred colorimetry data of each patch 10c is stored in the RAM 1-2. The CPU 1-1 of the main control apparatus 1 calculates colorimetic values from the colorimetry data of each patch 10c from the colorimetry control apparatus 2 and stores them in the colorimetic value memory 1-11 (step S915). Next, the CPU 1-1 makes the colorimetic values of each patch in the colorimetic value memory 1-11 correspond to the dot area percent of each ink color of each patch 10c, which is stored in the patch data memory 1-10, in the order of data, and stores these relationships in the profile memory 1-13 as the profile of the printing press B (step S916).

Figure 10:
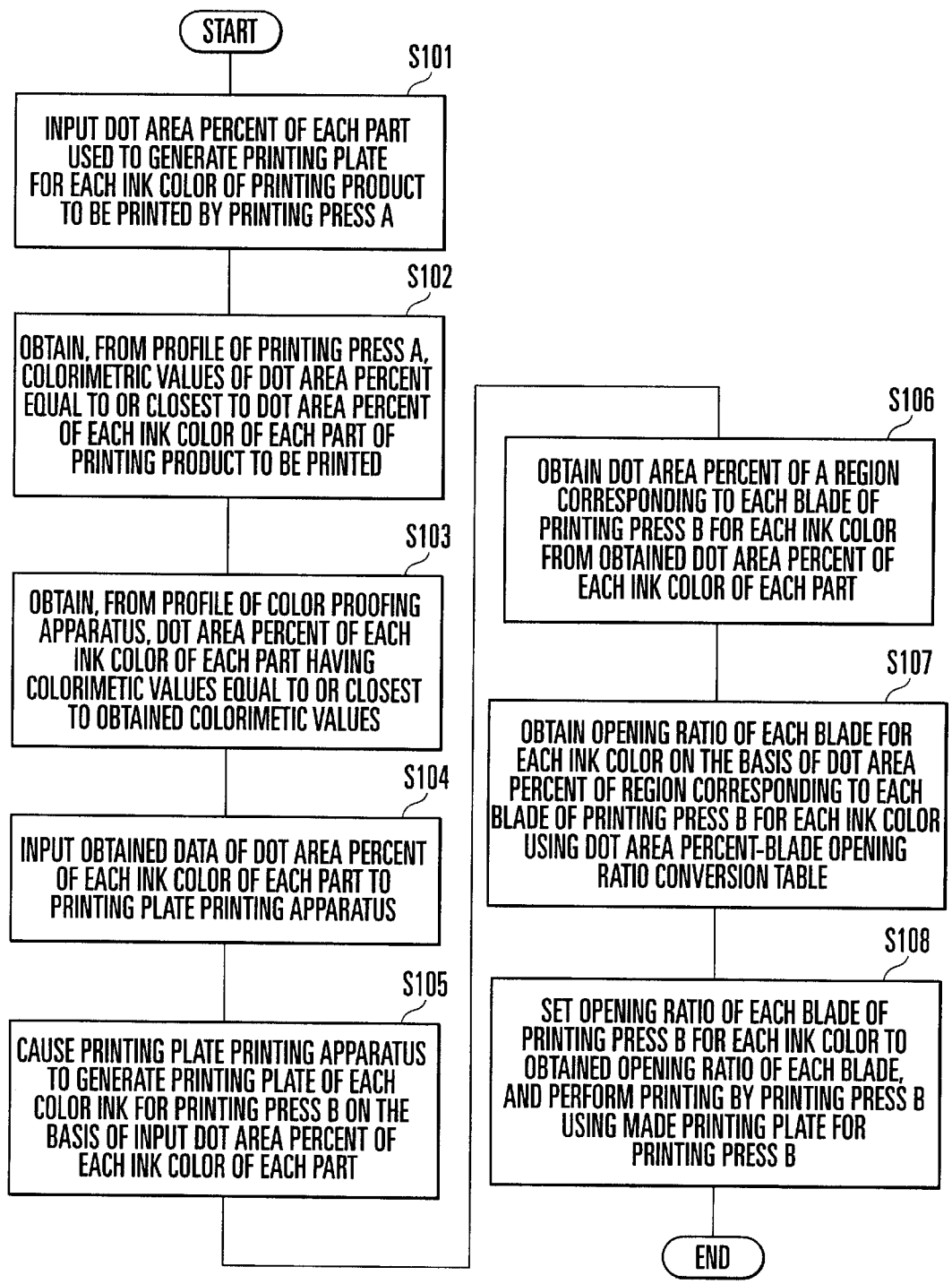
FIG. 10 is a flow chart showing the color matching operation between the printing presses A and B.

[Color Matching (FIG. 10)]

The operator inputs the dot area percent of each part of a printing plate, for each ink color, of a printing product to be printed by the printing press A to the input unit 1-4 (step S101). At this time, the input dot area percent of each part of the printing plate for each ink color has not a measurement value from the printing plate but a value predetermined for the part of the printing plate. More specifically, the value actually input to the printing plate printing apparatus 9 in generating the printing plate for each ink color is used as a set value, and this set value is input in step S101 as the dot area percent of each part for each ink color.

The CPU 1-1 obtains colorimetic values corresponding to a dot area percent equal or closest to the dot area percent of each part for generating the printing plate, for each ink color, of a printing product to be printed from the profile of the printing press A in the profile memory 1-12 (step S102). Next, the CPU 1-1 obtains the dot area percent of each ink color having colorimetic values equal or closest to the colorimetic values obtained in step S102 from the profile of the printing press B stored in the profile memory 1-13 (step S103).

The CPU 1-1 supplies the obtained data of dot area percent of each part for each ink color to the printing plate printing apparatus 9 (step S104). The printing plate printing apparatus 9 generates a printing plate for each ink color used for the printing press B (step S105). In this case, the printing plate for each ink color is generated by plate making on the machine. That is, a plate making unit added to the printing unit of each ink color is operated to print an image on a raw plate attached to the plate cylinder for that ink color.

Figure 11:
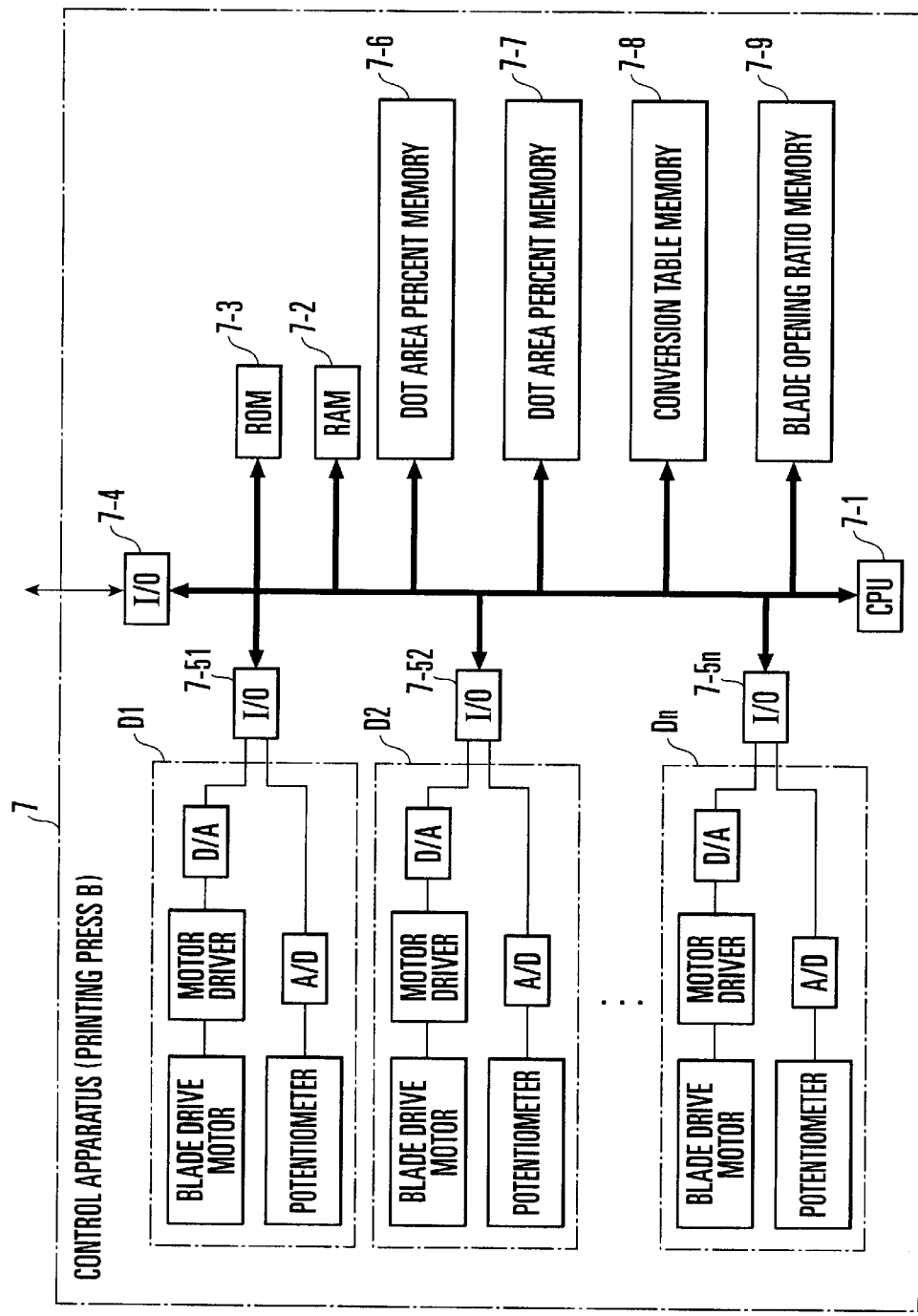
FIG. 11 is a block diagram showing a control apparatus for the printing press B.

The CPU 1-1 sends the obtained dot area percent of each ink color of each part to the control apparatus 7 of the printing press B. FIG. 11 shows the control apparatus 7 of the printing press B. Referring to FIG. 11, the control apparatus 7 is constructed by a CPU 7-1, RAM 7-2, ROM 7-3, input/output interfaces (I/O) 7-4 and 7-51 to 7-5n, memories 7-6 to 7-9, and blade drive units D1 to Dn. The blade drive units D1 to Dn are provided in correspondence with n blades (ink fountain keys) juxtaposed in the axial direction of an ink fountain roller (not shown).

The memory 7-6 stores the dot area percent of each ink color of each part to generate a printing plate for each ink color to be used for printing. The memory 7-7 stores the dot area percent of each ink color in a region corresponding to each blade of the printing press B. The memory 7-8 stores a table of ink color dot area percent and blade opening ratio for the printing press B. The memory 7-9 stores the opening ratio of each blade for each printing unit of the printing press B.

Referring back to FIG. 10, the CPU 7-1 obtains the dot area percent of a region corresponding to each blade for each ink color in the printing press B from the dot area percent of each part for each ink color, which is supplied from the main control apparatus 1 (step S106). The dot area percent of each part for each ink color, which is supplied for the main control apparatus 1, is stored in the memory 7-6, and the obtained dot area percent of a region corresponding to each blade of the printing press B for each ink color is stored in the memory 7-7.

The CPU 7-1 obtains the opening ratio of each blade for each ink color from the obtained dot area percent of a region corresponding to each blade of the printing press B for each ink color using the table of ink color dot area percent and blade opening ratio stored in the memory 7-8 (step S107). The obtained opening ratio of each blade for each ink color is stored in the memory 7-9. The CPU 7-1 drives the blade drive units D1 to Dn, thereby setting the opening ratio of each blade of the printing press B for each ink color to the obtained opening ratio of each blade for each ink color. Finally, the CPU 7-1 performs printing by the printing press B using the printing plate for the printing press B, which is generated by plate making on the machine (step S108).

Figure 14A:
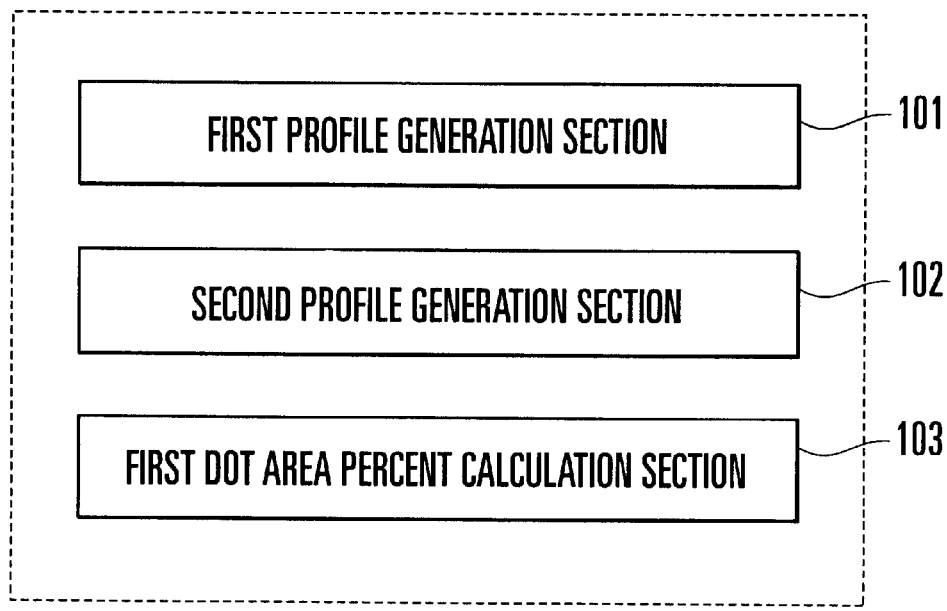
FIGS. 14A and 14B are functional block diagrams showing the CPU in a main control apparatus and the CPU in a control apparatus for the printing press B, respectively.
Figure 14B:
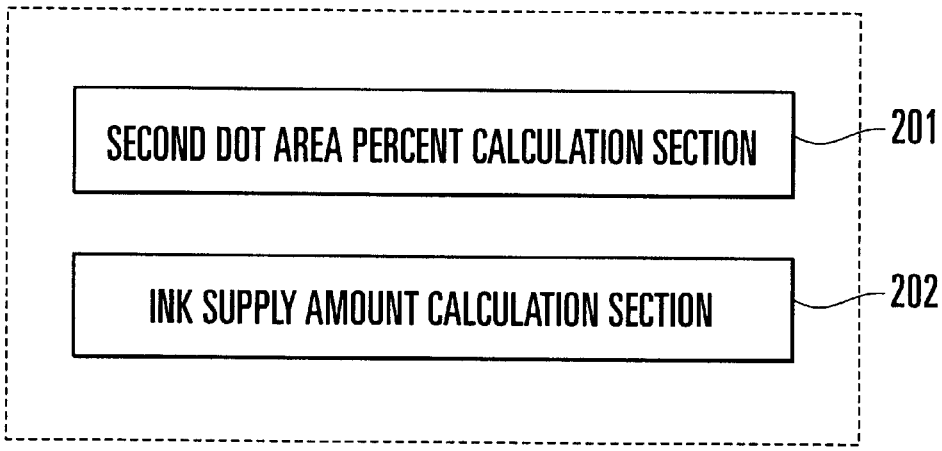

FIGS. 14A and 14B show the functional blocks of the CPU 1-1 in the main control apparatus 1 and the CPU 7-1 in the control apparatus 7 (FIG. 11) of the printing press B. Referring to FIG. 14A, the CPU 1-1 has a first profile generation section 101 and second profile generation section 102. The first profile generation section 101 generates the first profile representing the color reproduction characteristics of the printing press A using the color data of a number of patches printed by the printing press A and the dot area percent of each ink color defined for each patch. The first profile generation section 101 executes steps S515 and S516 in FIG. 5. The second profile generation section 102 generates the second profile representing the color reproduction characteristics of the printing press B using the color data of a number of patches printed by the printing press B and the dot area percent of each ink color defined for each patch. The second profile generation section 102 executes steps S915 and S916 in FIG. 9. A first dot area percent calculation section 103 obtains the dot area percent of each ink color to be used to print a printing product by the printing press B on the basis of the first and second profiles generated by the first and second profile generation sections 101 and 102. The first dot area percent calculation section 103 executes steps S102 and S103 in FIG. 10.

Referring to FIG. 14B, the CPU 7-1 has a second dot area percent calculation section 201 and ink supply amount calculation section 202. The second dot area percent calculation section 201 obtains the dot area percent of a region corresponding to each ink fountain key of the printing press B for each ink color from the dot area percent of each ink color, which is obtained by the first dot area percent calculation section 103. The second dot area percent calculation section 201 executes step S106 in FIG. 10. The ink supply amount calculation section 202 obtains the ink supply amount to be used to print a printing product by the printing press B on the basis of the dot area percent corresponding to each ink fountain key, which is obtained by the second dot area percent calculation section 201. The ink supply amount calculation section 202 executes step S107 in FIG. 10.

The first and second profile generation sections 101 and 102 may be formed from a single printing profile generation section. The second dot area percent calculation section 201 and ink supply amount calculation section 202 may be provided not in the control section 7 of the printing press B but in the main control apparatus 1.

According to this embodiment, the tint of a printing product to be printed by the printing press A can be made to match that of a printing product printed by the printing press B. In this case, the operator need not adjust the ink supply amount referring to the color proofing print during printing. In addition, the color matching time can be shortened, and the printing materials are not wasted.

Since the color charts 3b (10b) and 4b are printed in the margin portions of the printing product 3 (10) and color proofing print 4, no special printing/output for generating a profile need be performed, and paper is not wasted. Additionally, the productivity is not severely affected.

Figure 12:
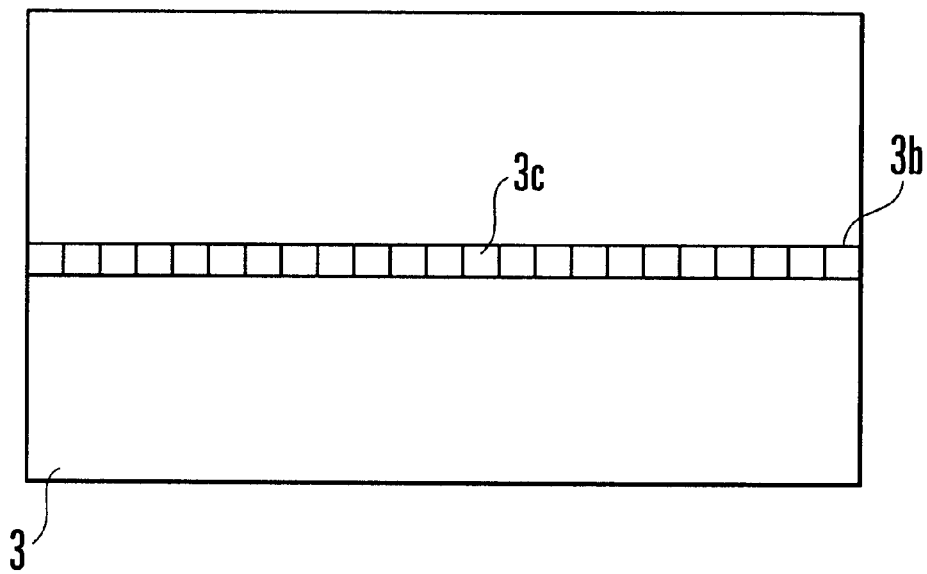
FIG. 12 is a plan view showing a printing product, for generating an profile, printed by a printing press.
Figure 13:
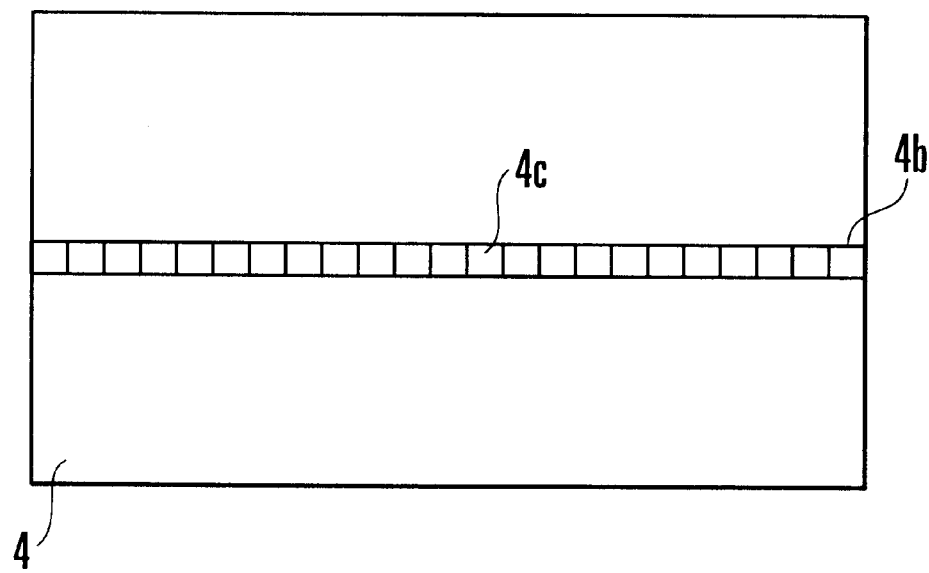
FIG. 13 is a plan view showing a color proofing print, for generating an profile, output from a color proofing apparatus.

According to this embodiment, the color chart 3b is printed on the margin portion except the pattern region 3a of the printing product 3, and the color chart 4b is output to the margin portion except the pattern region 4a of the color proofing print 4. As shown in FIGS. 12 and 13, the printing portion 3 and color proofing print 4 may not have any patterns and may have only the color chart 3b printed thereon and the color proofing print 4 output thereto, respectively.

In this embodiment, a case wherein a printing press A to be used for printing becomes unavailable, and an alternative printing press B is used. The present invention may be applied to a case wherein a printing press other than the printing press A is used for printing.

In this embodiment, colorimetic values most approximate to the set dot area percent of each ink color are selected. However, the colorimetic values may be corrected in accordance with the degree of approximation, and the color proofing profile or the profile of the printing press B may be referred to. When the color proofing profile or the profile of the printing press B is to be referred to, the dot area percent of each ink color may be corrected and output for proofing in accordance with the degree of approximation.

As has been described above, according to the present invention, the dot area percent of each ink color in printing a printing product by the second printing press is obtained on the basis of the first profile representing the color reproduction characteristic of the first printing press and the second profile representing the color reproduction characteristic of the second printing press, thereby printing a printing product, by the second printing press, in the same tint as by the first printing press. This reduces a burden on the operator when a printing press A to be used for printing becomes unavailable, and an alternative printing press B need be used. Additionally, time for color matching can be shortened, and waste of print materials can be avoided.

What is claimed is:

1. A color management method for a printing press, comprising the steps of:

generating a first profile representing color reproduction characteristics of a first printing press using color data of a number of patches printed by the first printing press and a dot area percent of each of a plurality of ink colors defined for each patch;

generating a second profile representing color reproduction characteristics of a second printing press using color data of a number of patches printed by the second printing press and a dot area percent of each of a plurality of ink colors defined for each patch; and obtaining the dot area percent of each ink color to be used to print a printing product by the second printing press on the basis of the first and second profiles.

2. A method according to claim 1, further comprising the steps of obtaining a dot area percent of a region corresponding to each ink fountain key of the second printing press for each ink color from the obtained dot area percent of each ink color, and obtaining an ink supply amount to be used to print the printing product by the second printing press on the basis of the obtained dot area percent of the region corresponding to each ink fountain key.

3. A method according to claim 2, wherein the step of obtaining an ink supply amount comprises the step of obtaining the ink supply amount as an ink fountain key opening ratio by looking up a conversion table which stores a relationship between the dot area percent and the ink fountain key opening ratio in advance.

4. A method according to claim 2, further comprising the step of setting the ink supply amount of the second printing press to the obtained ink supply amount.

5. A method according to claim 1, further comprising the steps of printing a color chart formed from the patches by the first and second printing presses using the plurality of ink colors, the patches having set combinations of the preset dot area percents of the ink colors, and sequentially sampling the color data of all the patches by automatically scanning the printed color chart using a colorimeter.

6. A method according to claim 1, further comprising the step of obtaining an ink supply amount to be used to print the printing product by the second printing press on the basis of the obtained dot area percent of each ink color.

7. A color management apparatus for a printing press, comprising:

printing profile generation means for generating first and second profiles representing color reproduction characteristics of first and second printing presses on the basis of a number of patches printed by the first and second printing presses; and first dot area percent calculation means for obtaining a dot area percent of each ink color to be used to print a printing product by the second printing press on the basis of the first and second profiles generated by said printing profile generation means.

8. An apparatus according to claim 7, further comprising second dot area percent calculation means for obtaining a dot area percent of a region corresponding to each ink fountain key of the second printing press for each ink color from the dot area percent of each ink color, which is obtained by said first dot area percent calculation means, and ink supply amount calculation means for obtaining an ink supply amount to be used to print the printing product by the second printing press on the basis of the dot area percent of the region corresponding to each ink fountain key, which is obtained by said second dot area percent calculation means.

9. An apparatus according to claim 8, wherein said apparatus further comprises a conversion table which stores a relationship between the dot area percent and an ink fountain key opening ratio in advance, and said ink supply amount calculation means obtains the ink supply amount as the ink fountain key opening ratio by looking up said conversion table.

10. An apparatus according to claim 8, further comprising ink supply amount setting means for setting the ink supply amount of the second printing press to the ink supply amount obtained by said ink supply amount calculation means.

11. An apparatus according to claim 10, wherein said second dot area percent calculation means, ink supply amount calculation means, and ink supply amount setting means are provided in the second printing press.

12. An apparatus according to claim 7, further comprising colorimetry control means for sampling color data of all the patches by automatically scanning, using a colorimeter, a color chart formed from the patches printed by the first and second printing presses using a plurality of ink colors.

13. An apparatus according to claim 7, wherein said printing profile generation means comprises first profile generation means for generating the first profile representing the color reproduction characteristics of the first printing press using color data of the number of patches printed by the first printing press and the dot area percent of each ink color defined for each patch, and second profile generation means for generating the second profile representing the color reproduction characteristics of the second printing press using color data of the number of patches printed by the second printing press and the dot area percent of each ink color defined for each patch.

14. An apparatus according to claim 7, further comprising ink supply amount calculation means (202) for obtaining an ink supply amount to be used to print the printing product by the second printing press on the basis of the obtained dot area percent of each ink color, which is obtained by said first dot area percent calculation means.

* * * * *